(12) United States Patent
Daram

(10) Patent No.: US 12,316,354 B2
(45) Date of Patent: May 27, 2025

(54) SMART FFT MEASUREMENT FOR RECONFIGURABLE SENSOR USING A WIDEBAND DIGITAL RECEIVER

(71) Applicant: Prasanna Kumar Daram, Dayton, OH (US)

(72) Inventor: Prasanna Kumar Daram, Dayton, OH (US)

( * ) Notice: Subject to any disclaimer, the term of this patent is extended or adjusted under 35 U.S.C. 154(b) by 120 days.

(21) Appl. No.: 18/449,888

(22) Filed: Aug. 15, 2023

(65) Prior Publication Data

US 2024/0063829 A1 Feb. 22, 2024

Related U.S. Application Data

(60) Provisional application No. 63/399,055, filed on Aug. 18, 2022.

(51) Int. Cl.
| | | |
|---|---|---|
| *H04L 27/00* | (2006.01) | |
| *G06F 7/24* | (2006.01) | |
| *H04B 1/00* | (2006.01) | |

(52) U.S. Cl.
CPC ............. *H04B 1/0017* (2013.01); *G06F 7/24* (2013.01)

(58) Field of Classification Search
CPC ................................. H04B 1/0017; G06F 7/24
USPC .......................................................... 375/316
See application file for complete search history.

(56) References Cited

U.S. PATENT DOCUMENTS

| | | | |
|---|---|---|---|
| 5,751,766 A | 5/1998 | Kletsky et al. | |
| 2004/0156445 A1* | 8/2004 | McCorkle ........... | H04L 27/0004 |
| | | | 375/295 |
| 2005/0100076 A1* | 5/2005 | Gazdzinski .......... | H04B 1/7176 |
| | | | 375/242 |

OTHER PUBLICATIONS

Tsui et al.; Digital Microwave Receiver Technology; IEEE Transactions on Microwave Theory and Techniques, vol. 50, No. 3; Mar. 2002.

Chen et al.; Design and Performance Evaluation of a 2.5-GSPS Digital Receiver; IEEE Transactions on Instrumentation and Measurement, vol. 54, No. 3; Jun. 2005.

George et al.; A Hybrid Computing Platform Digital Wideband Receiver Design and Performance Measurement; IEEE Transactions on Instrumentation and Measurement, vol. 60, No. 12; Dec. 2011.

Emmert et al.; An FFT Approximation Technique Suitable for On-Chip Generation and Analysis of Sinusoidal Signals; Microelectronic Design Automation and Test Lab, Dept. of Electrical Engineering, Wright State University; 2003.

Implementing FFT-Based Digital Channelized Receivers on FPGA Platforms; IEEE Transactions on Aerospace and Electronic Systems, vol. 44, No. 4; Oct. 2008.

(Continued)

*Primary Examiner* — Helene E Tayong
(74) *Attorney, Agent, or Firm* — Thomas E. Lees, LLC

(57) ABSTRACT

Processes and devices for finding signals within a frequency range include converting an analog input signal to a digital domain using an analog-to-digital converter to create a digital input signal. A first fast Fourier transform (FFT) converts the digital input signal to a frequency input signal, which is binned based on frequency and a threshold to create a binary filter. The digital input signal (from the analog-to-digital converter) is sorted into containers (e.g., using the Chinese remainder theorem) and then run through a second FFT to convert the digital input signal to a frequency intermediate signal. The frequency intermediate signal is sorted into bins and multiplied using the binary filter to create an output frequency signal.

20 Claims, 10 Drawing Sheets

(56) References Cited

OTHER PUBLICATIONS

Lin et al.; Two Signal High Dynamic Range and High Resolution Wideband Digital Receiver Using Beat Frequency; Air Force Research Laboratory, Wright-Patterson AFB, OH.
Pok et al.;Chip Design for Monobit Receiver; IEEE Transactions on Microwave Theory and Techniques, vol. 45, No. 12; Dec. 1997.
Agarwal et al.; High-Throughput Implementation of a Million-Point Sparse Fourier Transform; Computer Science & Artificial Intelligence Laboratory, Massachusetts Institute of Technology, MA.
Lopez-Risueno et al.; Multiple Signal Detection and Estimation using Atomic Decomposition and EM; EEE Transactions on Aerospace and Electronic Systems, vol. 42, No. 1; Jan. 2006.
George et al.; Multiple Signal Detection and Measurement Using a Configurable Wideband Digital Receiver; Department of Electrical Engineering, Wright State University, Dayton, Ohio.
Manavski et al.; CUDA Compatible GPU Cards as Efficient Hardware Accelerators for Smith-Waterman Sequence Alignment; BMC Bioinformatics; 2008.
George et al.; Multiple Signal Detection Digital Wideband Receiver Using Hardware Accelerators; IEEE Transactions on Aerospace and Electronic Systems, vol. 49, No. 2; Apr. 2013.
Yang et al.; Parallel Image Processing Based on CUDA; International Conference on Computer Science and Software Engineering; 2008.
Hamada et al.; 42 TFlops Hierarchical N-body Simulations on GPUs with Applications in Both Astrophysics and Turbulence.
Nickolls et al.; The GPU Computing Era; IEEE Computer Society; 2010.
Shenoy et al.; Fast Base Extension Using a Redundant Modulus in RNS; IEEE Transactions on Computers, vol. 38, No. 2; Feb. 1989.

\* cited by examiner

SMART FFT MEASUREMENT FOR RECONFIGURABLE SENSOR USING A WIDEBAND DIGITAL RECEIVER

CROSS REFERENCE TO RELATED APPLICATIONS

This application claims the benefit of U.S. Provisional Patent Application Ser. No. 63/399,055, filed Aug. 18, 2022, entitled SMART FFT MEASUREMENT FOR RECONFIGURABLE SENSOR USING A WIDEBAND DIGITAL RECEIVER, the disclosure of which is hereby incorporated herein by reference

BACKGROUND

Various aspects of the present invention relate generally to fast Fourier transforms and specifically to a smart fast Fourier transform for use in a wideband receiver.

Ultra-wideband (UWB) is a radio technology that can use a very low energy level for short-range, high-bandwidth communications over a large portion of the radio spectrum. UWB has traditional applications in non-cooperative radar imaging. Most recent applications target sensor data collection, precise locating, and tracking.

A significant difference between conventional radio transmissions and UWB is that conventional systems transmit information by varying the power level, frequency, and/or phase of a sinusoidal wave. UWB transmissions transmit information by generating radio energy at specific time intervals and occupying a large bandwidth, thus enabling pulse-position or time modulation. The information can also be modulated on UWB signals (pulses) by encoding the polarity of the pulse, its amplitude and/or by using orthogonal pulses. UWB pulses can be sent sporadically at relatively low pulse rates to support time or position modulation, but can also be sent at rates up to the inverse of the UWB pulse bandwidth.

BRIEF SUMMARY

According to aspects of the present disclosure, a processes for finding signals within a frequency range includes converting an analog input signal to a digital domain using an analog-to-digital converter to create a digital input signal. A first fast Fourier transform (FFT) converts the digital input signal to a frequency input signal, which is binned based on frequency and a threshold to create a binary filter. The digital input signal (from the analog-to-digital converter) is sorted into containers (e.g., using the Chinese remainder theorem) and then run through a second FFT to convert the digital input signal to a frequency intermediate signal. The frequency intermediate signal is sorted into bins and multiplied using the binary filter to create an output frequency signal.

According to further aspects of the present disclosure, a device (e.g., a receiver) for finding signals within a frequency range includes converting an analog input signal to a digital domain using an analog-to-digital converter to create a digital input signal. A first fast Fourier transform (FFT) converts the digital input signal to a frequency input signal, which is binned based on frequency and a threshold to create a binary filter. The digital input signal (from the analog-to-digital converter) is sorted into containers (e.g., using the Chinese remainder theorem) and then run through a second FFT to convert the digital input signal to a frequency intermediate signal. The frequency intermediate signal is sorted into bins and multiplied using the binary filter to create an output frequency signal.

DETAILED DESCRIPTION

According to aspects of the present disclosure, a smart fast Fourier transform (SFFT) is described that, among other things, allows for an ultra-wideband receiver to quickly detect multiple signals within the ultra-wideband. Thus, UWB offers low-power execution with a fine time target and a high throughput. To achieve this, UWB sends short bursts of data at short separations without interference with other existing remote communications frameworks.

Further, embodiments of the SFFT discussed herein can be used in other applications such as transmitters and receivers mobile networks such as 5G (fifth generation mobile network), other networking protocols, DNA (deoxyribonucleic acid) sequencing, amplification of molecules, astronomical detection of various radio objects using satellites and ground antennas, arithmetic logic units for processors, neuromorphic networks, neural networks, etc. Basically, any application that requires a change from an original domain to a frequency domain and/or vice-versa other cross-correlation calculations can make use of embodiments of the SFFT processes described herein.

Figure 1:
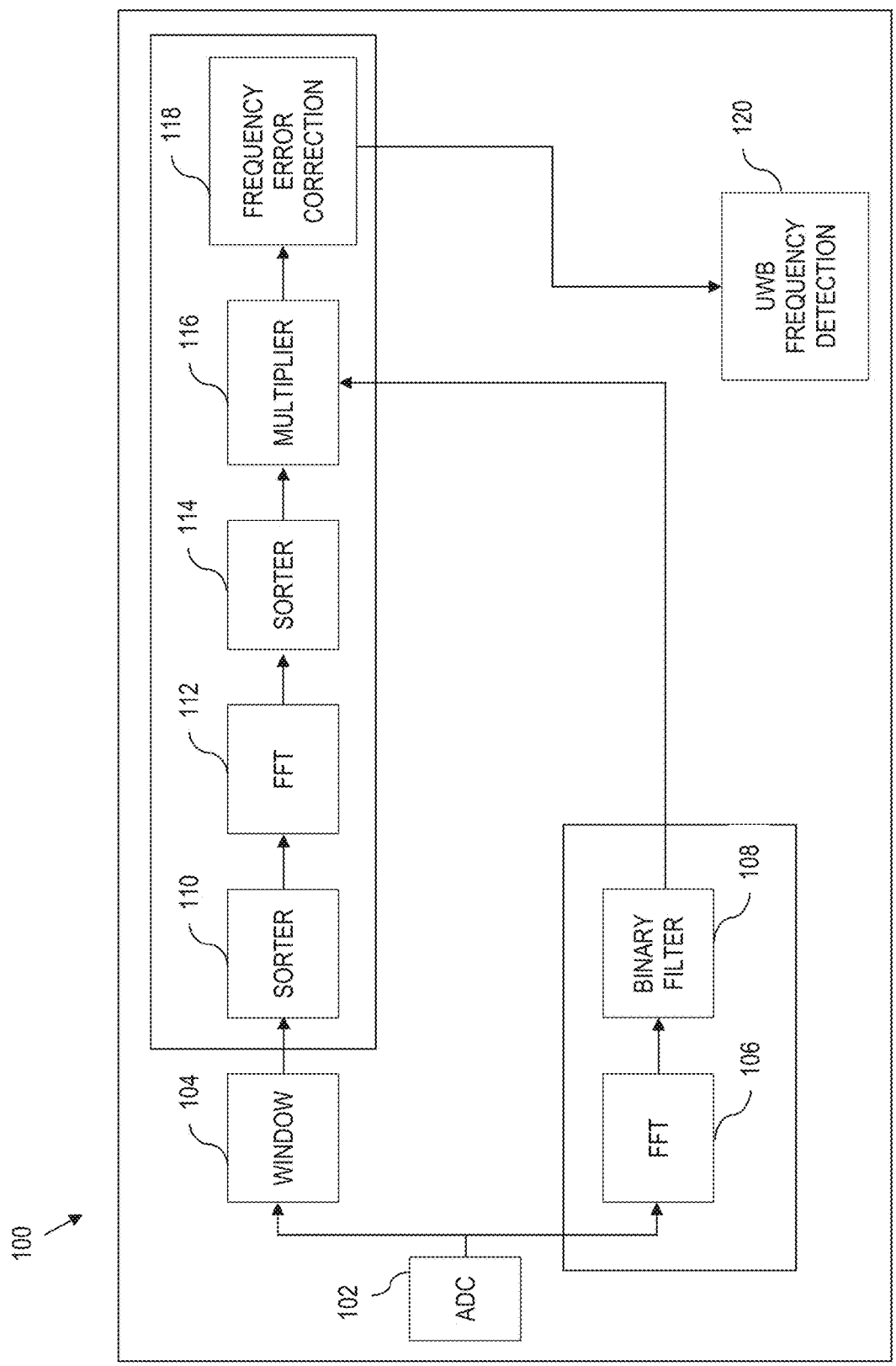
FIG. 1 is a block diagram of an ultra-wideband receiver, according to aspects of the present disclosure.

FIG. 1 illustrates an UWB receiver 100 according to aspects of the present disclosure. The UWB receiver 100 includes an analog-to-digital converter (ADC) 102 to convert an analog input signal (e.g., a UWB signal) to a digital domain to create a digital input signal. A sampling rate of the ADC 102 should be at least twice the highest relevant frequency in the received signal. For example, if an analog signal is received that includes relevant frequencies 40-1240 MHz in the time domain, a 2.56 GHz 12-bit ADC may be used to convert the analog input signal to the digital input signal.

The ADC 102 feeds both a windowing function 104 and a first FFT 106. The first FFT 106 converts the digital input signal to a frequency input signal, which is binned into bins using a threshold to create a binary filter 108.

The windowing function 104 distributes the digital input signal timewise into several registers (e.g., eight, twelve-bit registers where the output of one of eight twelve-bit registers feeds a subsequent twelve-bit register). For example, a 32768-point windowing function can store eight samples of 4096-bit data (e.g., an output of the 12-bit ADC mentioned above) over time and shift that data through the eight samples (e.g., 4096-bit data from register_3 is shifted to register_4, register_4 is shifted to register_5, and so on).

The windowing function 104 feeds a first sorter 110 that sorts the digital input signal from the windowing function 104 into containers. For example, a Chinese remainder theorem may be used in this sorting process (bucketization process). For example, twelve continuous digitized information focal points are stored in a container that has four information focal points.

A second FFT 112 (with a number of points equal to the number of points of the first FFT 106) converts the sorted digital input signal to a frequency intermediate signal. For example, if the first FFT 106 is a 4096-point FFT, then the second FFT 112 is a 4096-point FFT. The first and second FFTs 106, 112 may be implemented in hardware (e.g., a field programmable gate array, application-specific integrated circuit, etc.), in software running on a processor (e.g., a graphic processing unit, other processors), or both.

The output of the second FFT 112 feeds a second sorter 114 that sorts the frequency intermediate signal (i.e., output of the second FFT) into designated bins.

The binned frequency intermediate signal is multiplied (by a multiplier 116) with the binary filter to find output signals, which are corrected for error in the error correction 118. Then the output signals are run through an ultra-wideband frequency detector 120 to detect the signals of interest in the received ultra-wideband signal.

Figure 2:
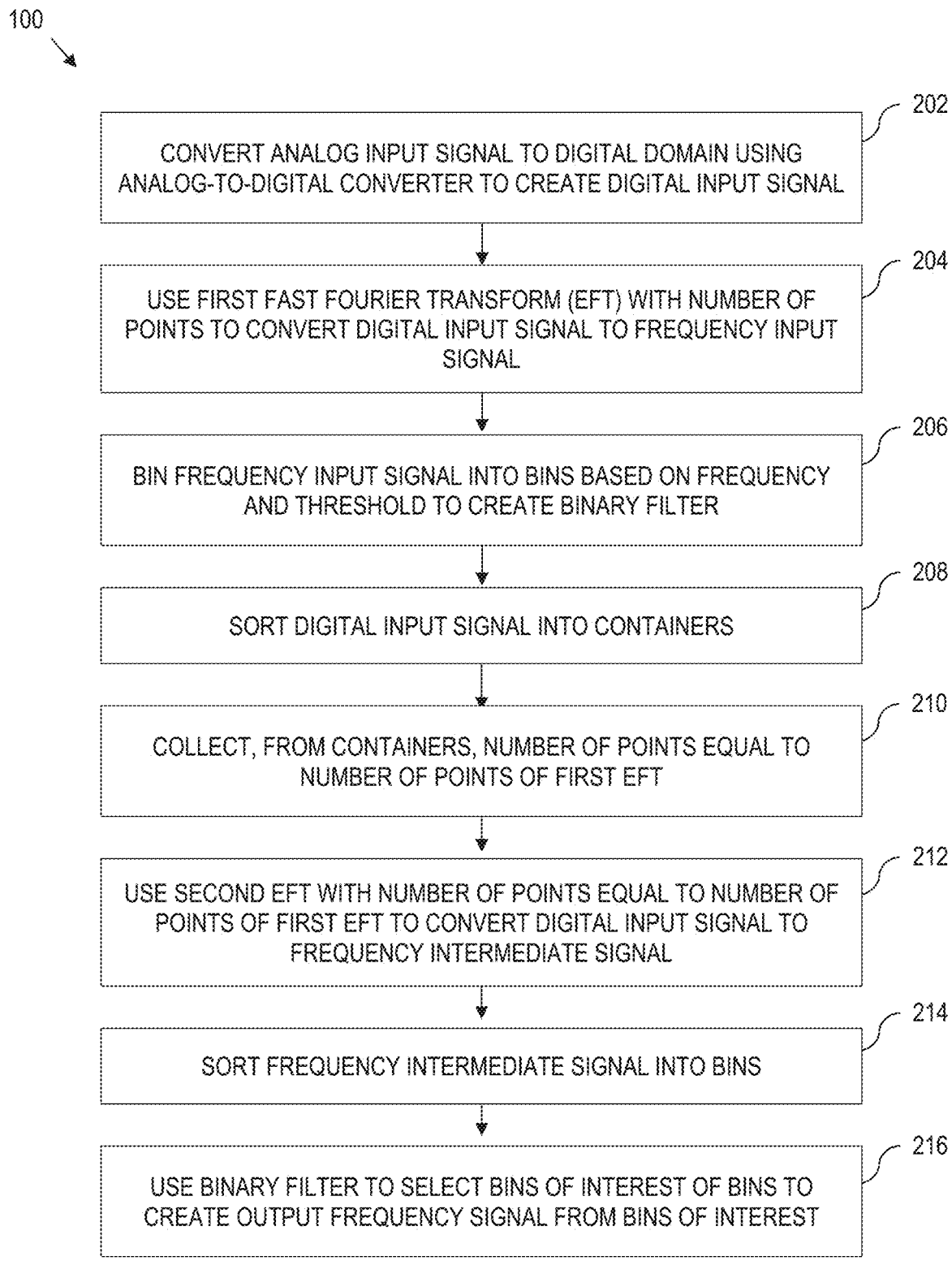
FIG. 2 is a flow chart of a process for detecting signals in an ultra-wideband signal, according to aspects of the present disclosure.

FIG. 2 illustrates a flow chart for a process 200 of detecting signals in an ultra-wideband signal. At 202, a received analog input signal is converted to the digital domain using an analog-to-digital converter (creating a digital input signal). At 204, a first FFT converts the digital input signal to a frequency input signal. In several embodiments, the digital input signal is also windowed using a window function, as discussed above. The FFT may be implemented in hardware (e.g., a field programmable gate array, application-specific integrated circuit, etc.), in software running on a processor (e.g., a graphic processing unit, other processors), or both.

At 206, the frequency input signal is binned based on frequency and a threshold to create a binary filter.

At 208, the digital input signal from step 202 (which may be windowed, as discussed above) is sorted into containers. For example, the Chinese remainder theorem may be used to assign the digital input signal to the containers. At 210, a number of points equal to the number of points of the first FFT are collected from the containers, and at 212, the collected points are passed through a second FFT to convert the digital input signal to a frequency intermediate signal. For example, if the FFT is 4096 points, then 4096 pieces of data are used. At 214, the frequency intermediate signal is sorted into bins, and at 216 is multiplied using the binary filter from step 206, which creates an output signal that may further be error corrected.

Thus, the process 200 creates a signal that indicates frequencies and signals carried by those frequencies from an ultra-wideband signal. This process 200 may be used in the receiver of FIG. 1, for military applications, etc. In some embodiments, the first and second FFTs are part of an FFT system that includes two FFTs. In various embodiments, the first and second FFTs are part of an FFT system that includes one FFT such that the first and second FFTs are the same FFT.

In ultra-wideband (UWB) signals preparing for handling million-point data using computationally severe FFT activity has created challenges. Application Meager FFT needs different emphasis of the SFFT algorithm while Smart FFT requires one-cycle.

An important capacity of advanced wideband beneficiaries is ultraweak different signal identification with high frequency accuracy and high uniqueness. The extension of the FFT length from 256 focuses to 4096 should be possible in any case. Many recipients use the signal location 256-point FFT length. Some algorithms have been proposed for signal detection in the ongoing history. In a receptor for nuclear degradation is suggested. Once again a configurable receiver identifies various signals before it has a different data arrangement. However, existing algorithms or systems are not suitable enough for distinguishing numerous signals precisely. Moreover, they offer lower processing and transfer speeds thus making them highly inefficient for precise signal detection. Currently, the exploitation of GPUs as quickening devices in a number of applications, such as DNA sequence, Digital receivers, Image Processing algorithms, Astrophysics, communication systems and much more, as proposed in has motivated to consider GPU for execution in this work. In this paper a smart brilliant FFT (SFFT) approach is proposed which uses an information base only. The Tesla K40a GPU is considered for execution. The FFT in the GPU is completed by NVIDIA using the CuFFT library.

Ultra-Wideband (UWB) is not a regular narrowband radio, it is a remote advanced correspondence framework which uses short beats. In view of the massive transmission of signal data, UWB ensures low-power execution with a fine time target and high throughput at short separations without interference with other existing remote correspondence frameworks.

The beneficiary consists of a wide-band low-noise amplifier (LNA), a wide tuning system, range bandpass filter (BPF), a twofold balanced channel. It also contains a Gilbert blender for downshift of the RF signal to zero-IF in quadrature.

Figure 4:
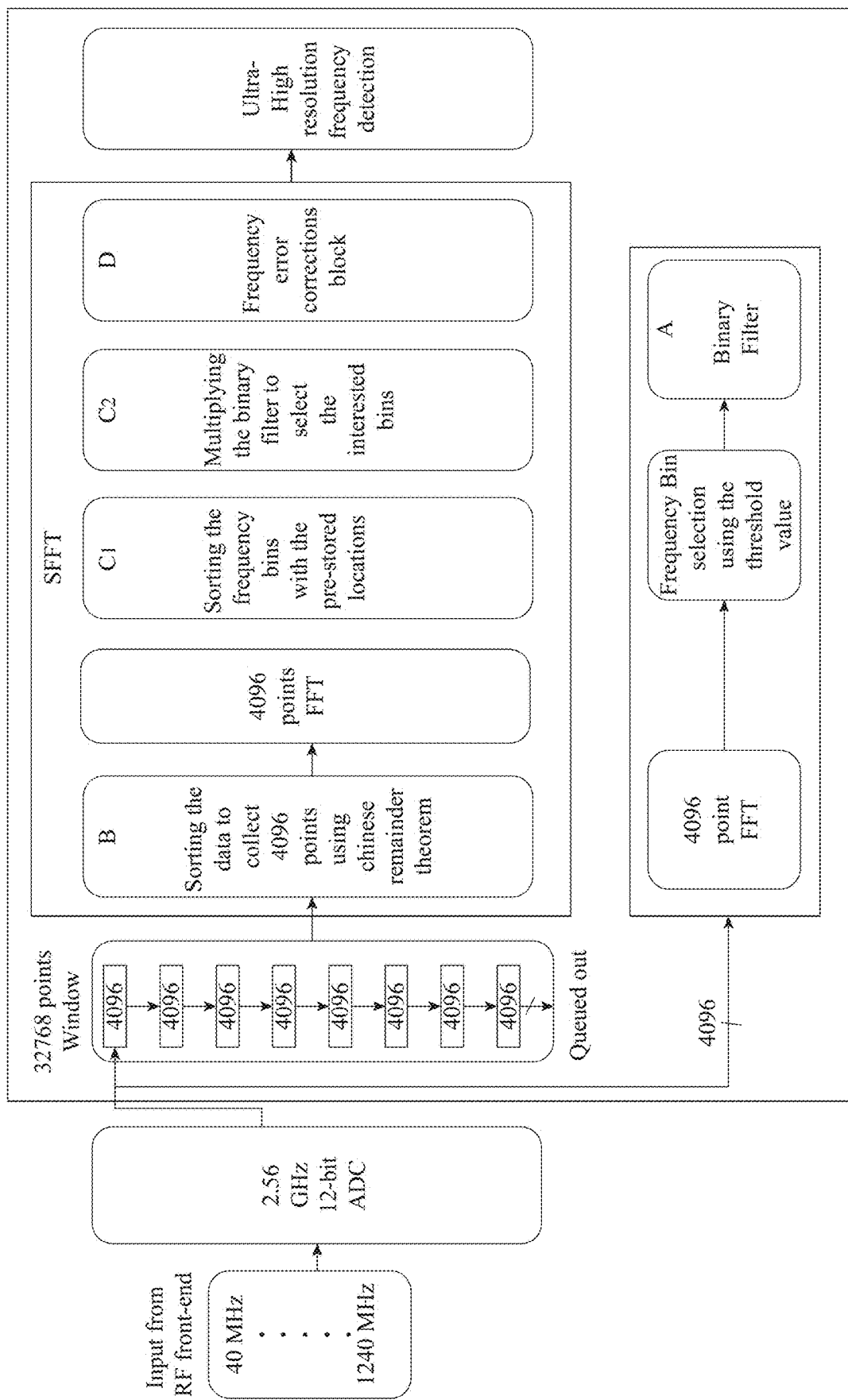
FIG. 4 is a block diagram of an ultra-wideband receiver, according to aspects of the present disclosure.

The center of the SFFT algorithm is the implementation of the FFT electronic data. FFT is the critical part of flag handling methods. The formal description of the Fast Fourier Transform can be found in numerous articles and books[18]. In order to group f(x) electronic data, the Fourier change yields I(X). The length of the FFT characterizes the size of the change (N). The relationship appears as follows:

$$I(X_k) = \sum_{j=0}^{N-1} f(x_{j*u+1})\left(\cos\cos\frac{2\pi kj}{N} + i\sin\sin\frac{2\pi kj}{N}\right) \quad (1)$$

where k ranges from 0 to N−1, f(x)=(x0, x1, . . . xN−1) is the digitized timespace information and I(X)=(X0, X1, . . . XN−1) displays the changed frequency area data. Each block of the SFFT as shown in FIG. 4 is clarified below.

A. FFT Binary Filter: Tested information from the front end of the computerized collector is taken from the 2.56 GHz ADC sampler for 12.8 μs. The paired channel consists of 1s and 0s.

Figure 3:
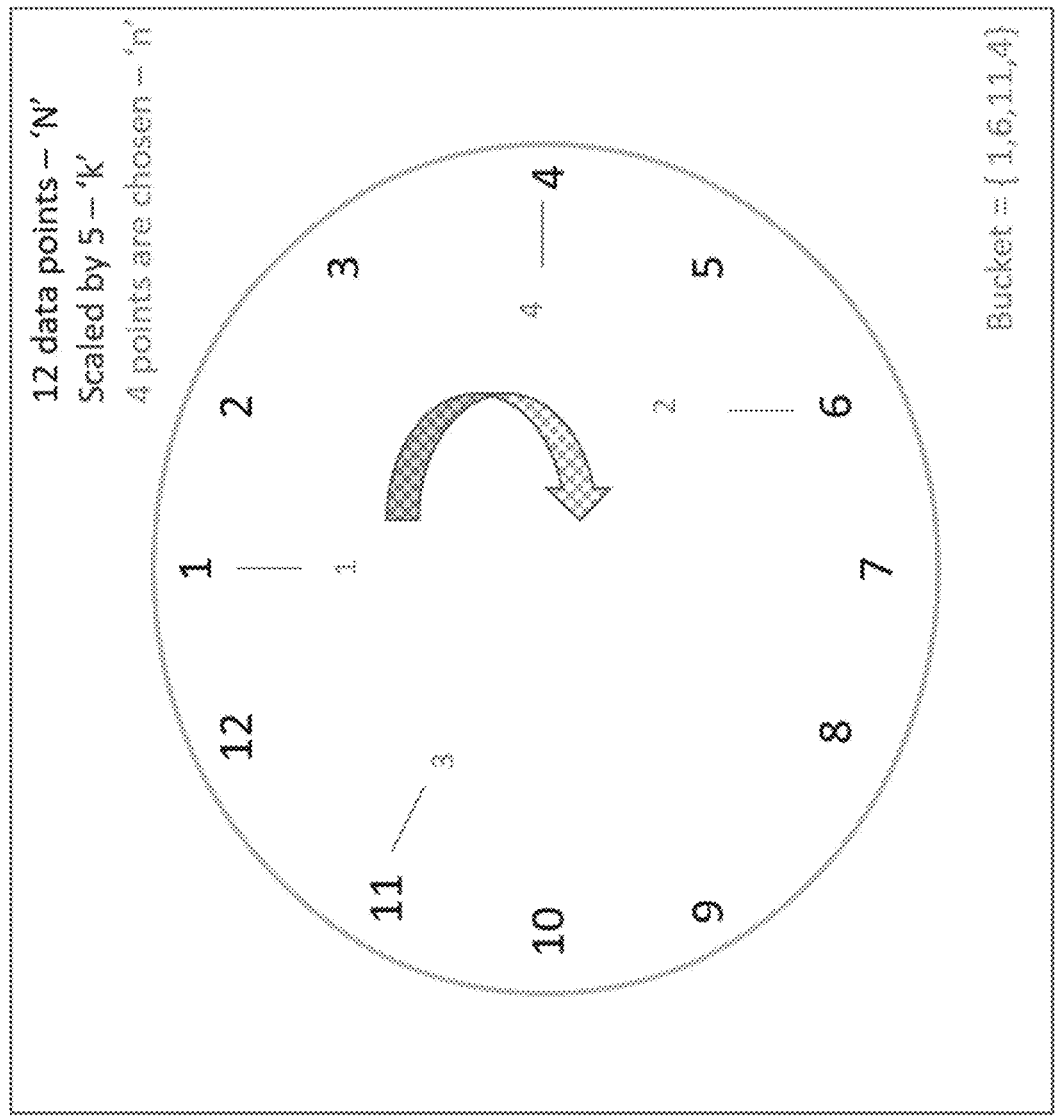
FIG. 3 is a visual representation of a bucketization process using the Chinese remainder theorem, according to aspects of the present disclosure.

B. Bucketization: Chinese remainder theorem is included in the bucketization process. For example, 12 continuous digitized information focal points are stored in a bin and the container has 4 information focal points. In this way, the set consists of {1, 6, 11, and 4} which is delineated in FIG. 3.

C. SFFT Binary Filter: The undersampled set is handled with a 4,096-point Fast Fourier change. For starters, any frequency receiver over the edge is a signal of recognition. Next, the nearby pinnacle receiver containers are removed from the SFFT channel.

Single Signal Detection

The signal frequencies are associated because of the bucketization. The following back includes an arranging technique that has re-established an area value of 4,096 FFT. The remodeled range shows a sufficient estimate of the recurrence of the canisters as opposed to that of the main FFT. The distinction in the plentifulness (60−50=15 dB) between the FFT and the SFFT continues the subsequent stage of recurrence mistake rectification.

Experimental Results (UWB)

Towards reducing the use of powers of a simple analog-to-digital transformation framework, an analogue pre-processing stage before an asynchronous converter is presented to discover the information values that are generally essential for a given application to be changed. Since the circumstances of the information esteems are not known from the earlier, simple pre-processing triggers the asynchronous converter to take an example, and the chance of an automated converter gauges the inter-sample time period. By changing over just the information esteems that are required, the framework can save a lot of intensity, both at the change stage and further down the signal. The detection of an accurate signal requires a high separation between the clamor and the quality of the signal. In spite of the fact that, in the light of the Fourier change restrictions, the frequency not on the number receiver can be precisely distinguished. The frequency error assessment is significant. The re-enactment with an input frequency from 40 to 1240 MHz with an increase of 1 MHz is completed. Variety in the sufficiency distinction, as the frequency increments are additionally shown in the side plot. Just when the information frequency is on the integer container, the fullness of the distinction is 0. The relative sufficiency contrasts are approximately 12.5 and 15 dB for frequency errors ±0.125 and ±0.25 MHz individually. The FFT can't separate two signals that are near one another. SFFT based collector can precisely distinguish two signals, which have a little frequency partition (1 frequency canister) and powerless. signal quality, 19 dB underneath the commotion floor.

Consider two close info signals, one solid and the other weak signal. The solid signal is 11 dB SNR at 187.653125 MHz (canister 300.234); the weak signal is 19 dB SNR at 188.903125 MHz (container 302.234).

Figure 5A:
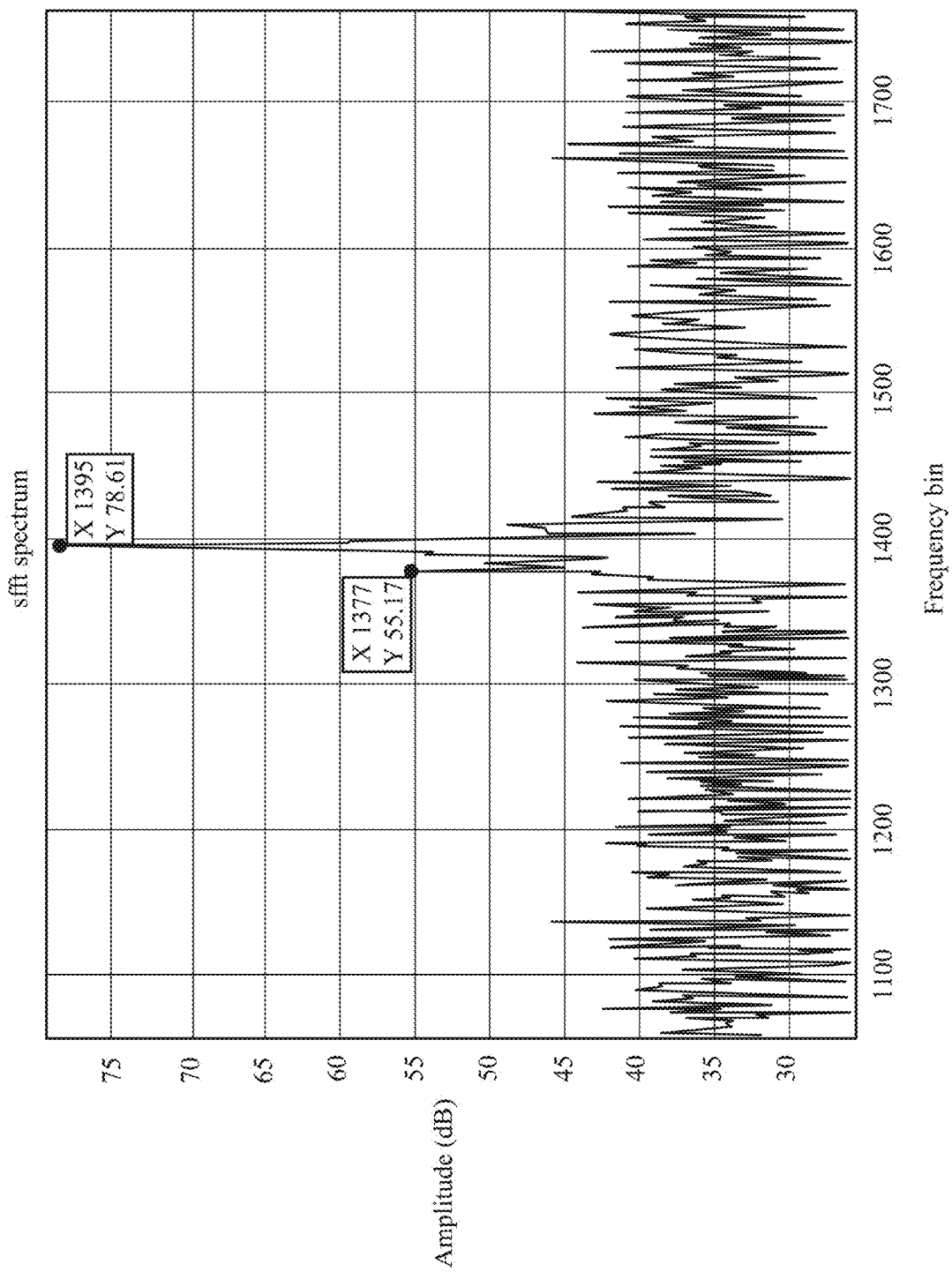
FIG. 5A is frequency graph of a smart fast Fourier transform (SFFT), according to aspects of the present disclosure.
Figure 5B:
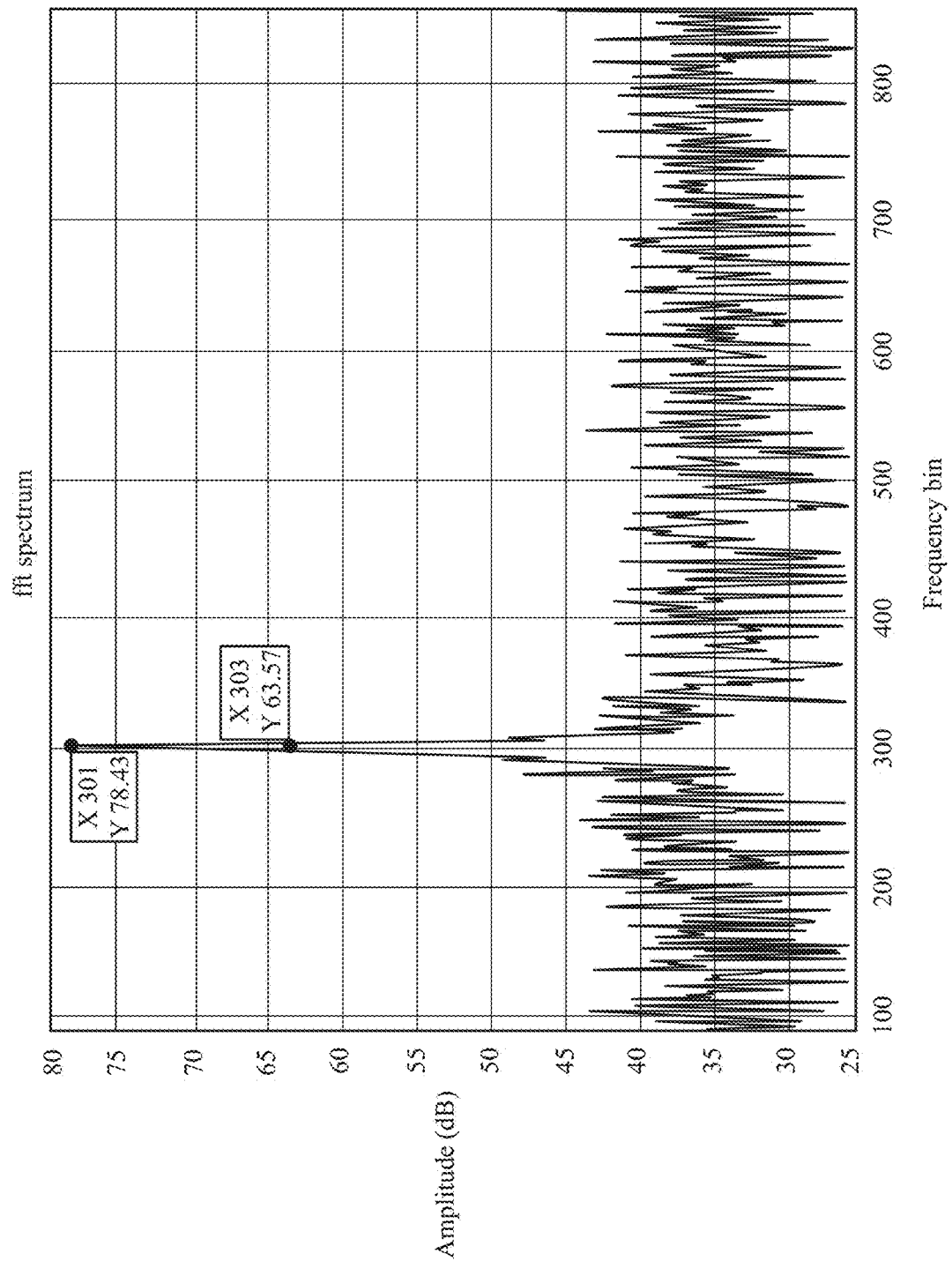
FIG. 5B is a frequency graph of a fast Fourier transform, according to aspects of the present disclosure.
Figure 5C:
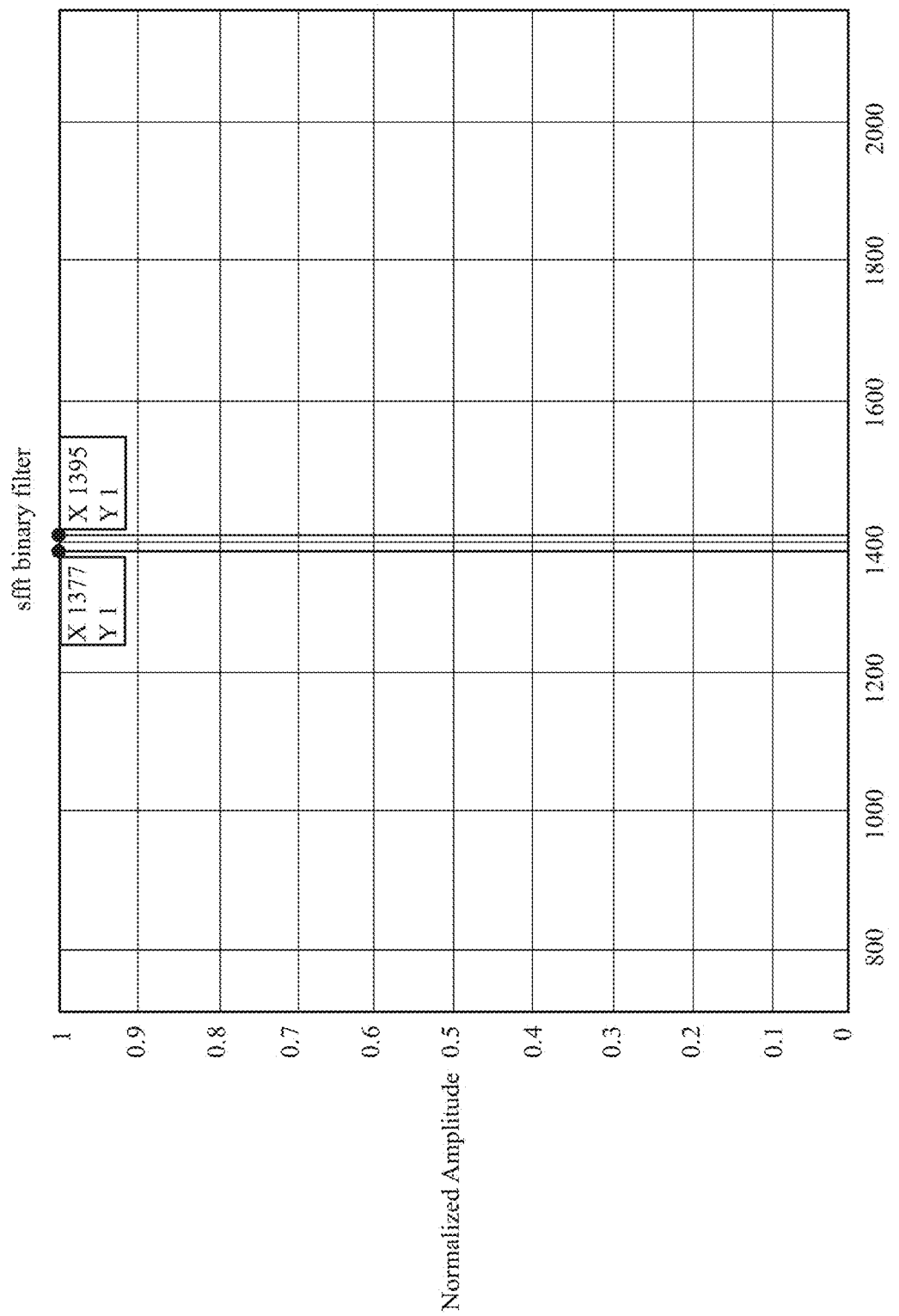
FIG. 5C is a frequency spectrum of a SFFT binary filter, according to aspects of the present disclosure.

FIG. 5A indicates that it is difficult to recognize input signals from FFT. As indicated in the previous part of the SFFT pseudonym, at any rate, there are 9 separate containers for undersampling rate 9. It is observed that after the dynamic cycle, the signals detected are 187.222255 MHz (canister 299.5556) and 188.611125 MHz (bin 301.7778) and the frequency errors are 0.424 MHz and 0.28512 MHz, respectively. Extensive distinction 10 dB to 188.611125 MHz signal error decreases by 0.125 MHz to 0.16012 MHz. This model shows a two-signal information range of 30 dB, 2 receiver partitions and an undersampling rate of 9 ({32, 768/4096}+1). In addition, a parallel channel is created in the appropriate areas as shown in FIG. 5C. FIG. 5B is the FFT spectrum.

Figure 6A:
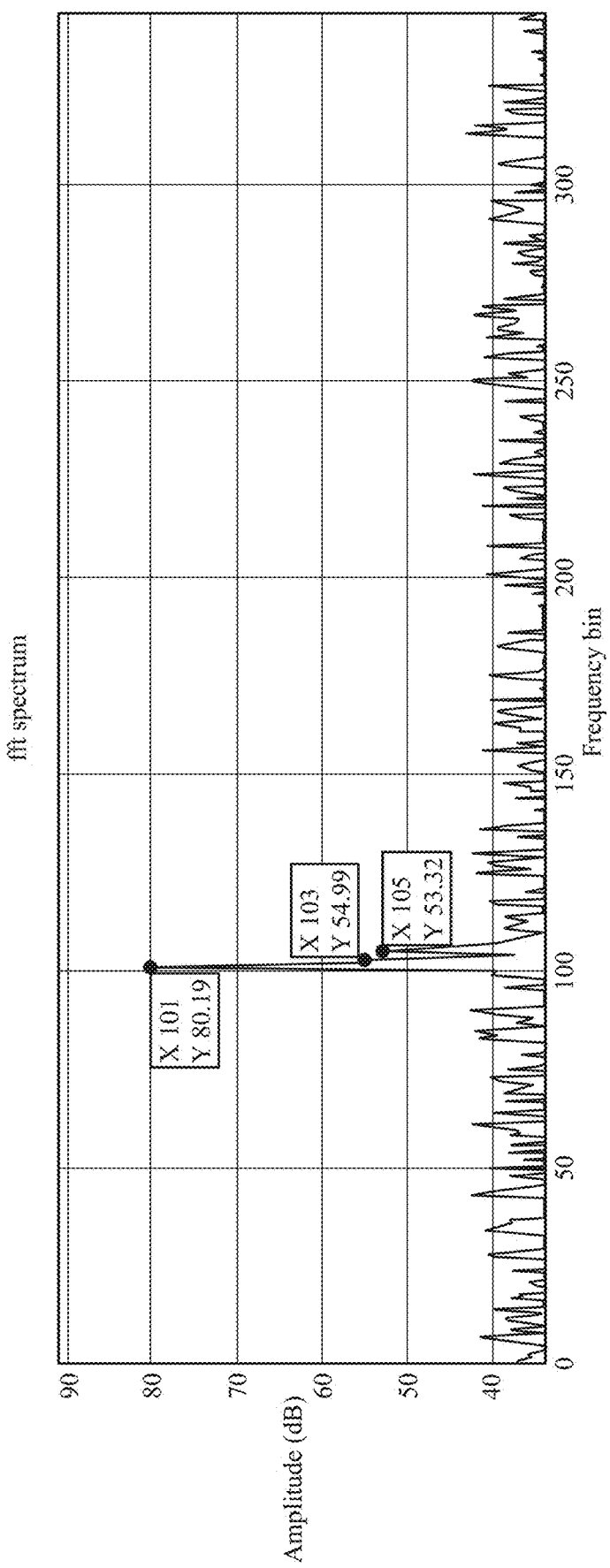
FIG. 6A is a frequency graph of a fast Fourier transform (FFT) showing three signals, according to aspects of the present disclosure.
Figure 6B:
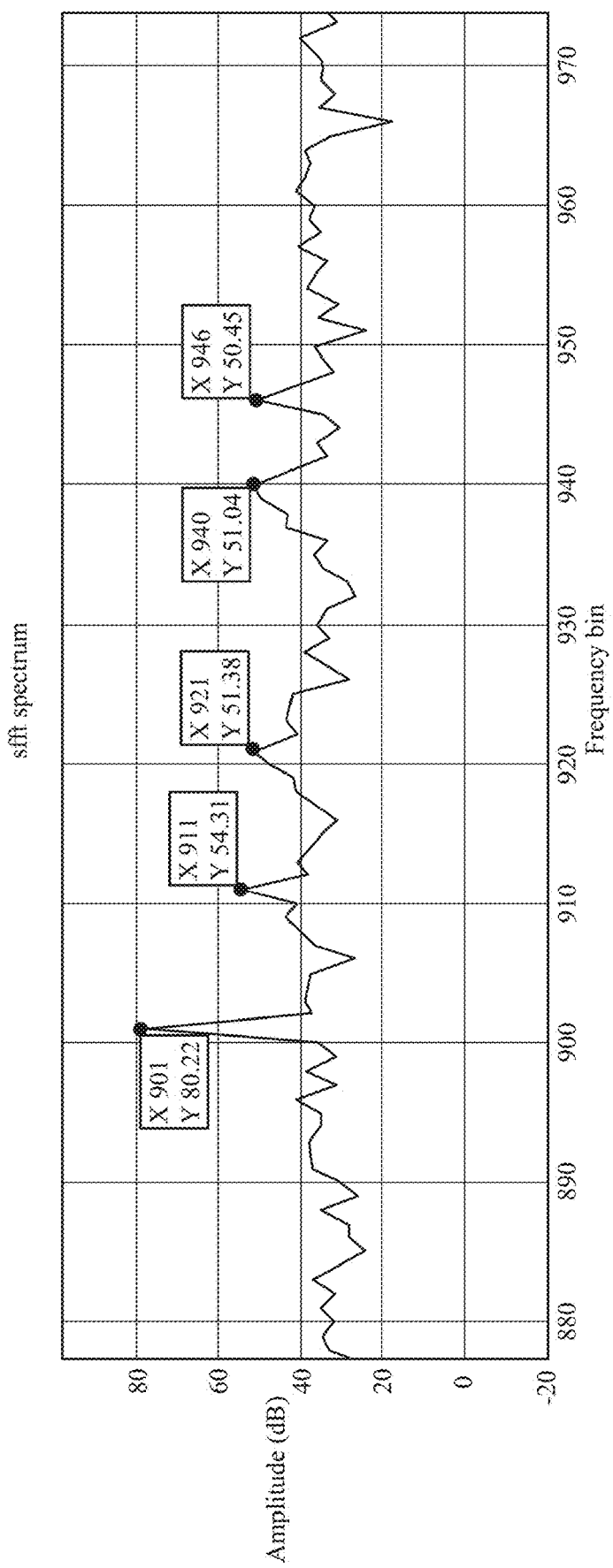
FIG. 6B is a frequency graph after bucketization, according to aspects of the present disclosure.

The proposed SFFT-based receiver is validated by using 5 synchronous info signals with almost 1 frequency container separated. The reported frequency error is found to be less than 0.625 MHz (1 frequency receiver) with a 5-signal information range of 30 dB. SNR distinguished SFFT frequency receivers, identified frequency and recognized frequency error are reported. In this case, the most grounded signal is 11 dB SNR, while the most vulnerable signal is −19 dB SNR and the other three signals are −15 dB SNR. Three signals are observed using standard FFT, as shown in FIG. 6A. The sufficiency of the subsequent frequency is much more modest, and the FFT's power is within the primary flap of the strong signal. In this way, FFT cannot distinguish between two low-quality frequencies close to a solid signal. However, as shown in FIG. 6B after the bucketization, all five frequencies are clearly separated by their amplitudes.

It is worth remembering that the dynamic cycle problem is much more modest than that of any recipient's algorithm. Runtime to measure for the Hardware worker is 0.175 ms. The computational constraint is a 4096 FFT activity that takes 0.11 ms in the Tesla K40c GPU.

As discussed above, embodiments of the SFFT may be used in any application that requires a transformation from one domain to another (e.g., frequency) domain or other cross-correlation calculations. For example, in DNA sequencing, where a regular FFT or discrete Fourier transform (DFT) may be used to perform correlations on DNA sequences in loglinear complexity (O(n log n)) time. Thus, Fourier transforms (e.g., embodiments of the SFFT disclosed herein) can be used for DNA sequencing.

Figure 7:
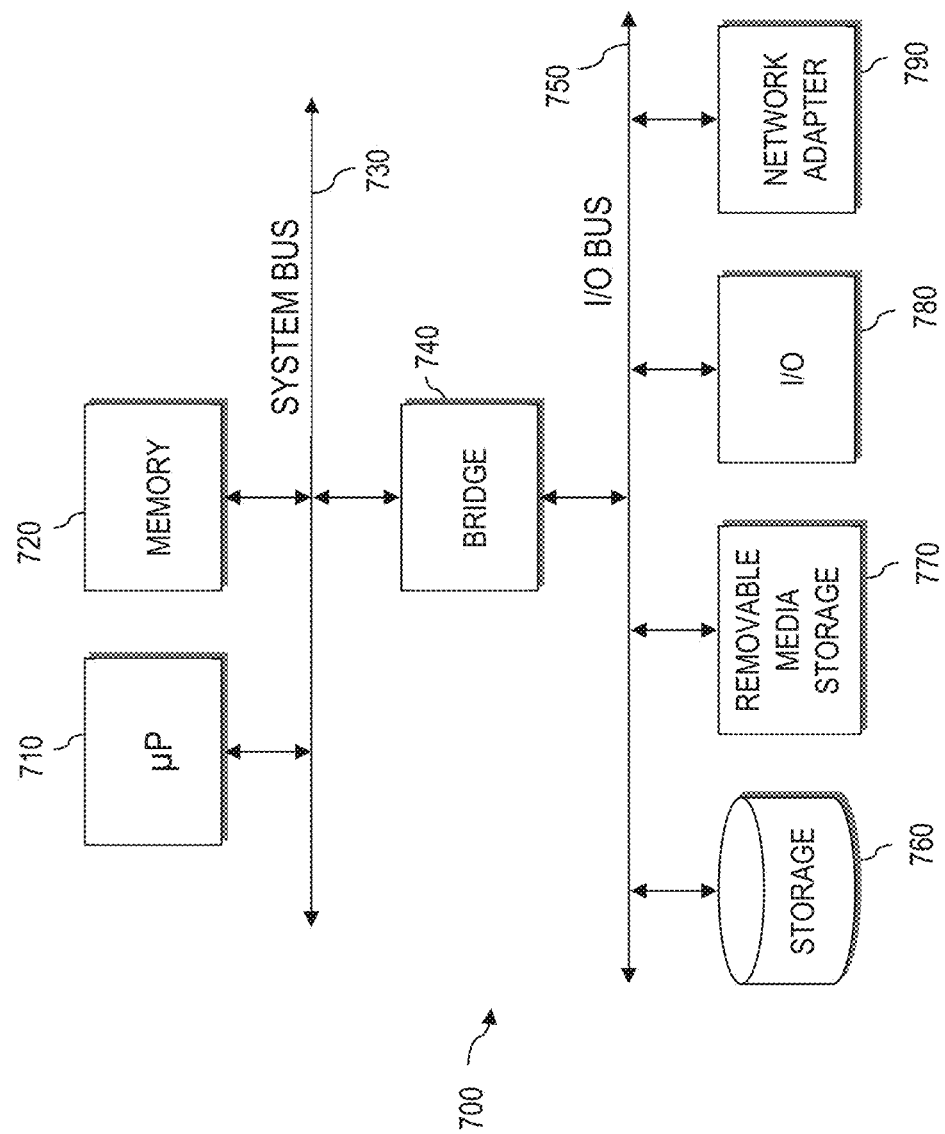
FIG. 7 is a block diagram a computing system that may be used for aspects of the processes and devices disclosed herein, according to aspects of the present disclosure.

Referring to FIG. 7, a block diagram of a data processing system (i.e., computer system) is depicted in accordance with the present invention. Data processing system 700 may comprise a symmetric multiprocessor (SMP) system or other configuration including a plurality of processors 710 connected to system bus 730. Alternatively, a single processor 710 may be employed. Also connected to system bus 730 is local memory 720. An I/O bus bridge 740 is connected to the system bus 730 and provides an interface to an I/O bus 750. The I/O bus may be utilized to support one or more buses and corresponding devices 770, such as storage 760, removable media storage 770, input output devices (I/O devices) 780, network adapters 790, etc. Network adapters may also be coupled to the system to enable the data processing system to become coupled to other data processing systems or remote printers or storage devices through intervening private or public networks.

Also connected to the I/O bus may be devices such as a graphics adapter, storage and a computer usable storage medium having computer usable program code embodied thereon. The computer usable program code may be executed to implement any aspect of the present invention, for example, to implement any aspect of any of the methods and/or system components described herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A process for finding signals within a frequency range, the process comprising:
   using a first fast Fourier transform (FFT) with a number of points to convert a digital input signal to a frequency input signal;
   binning the frequency input signal into bins based on frequency and a threshold to create a binary filter;
   sorting the digital input signal into containers;
   collecting, from the containers, a number of points equal to the number of points of the first FFT;
   using a second FFT with the number of points equal to the number of points of the first FFT to convert the digital input signal to a frequency intermediate signal;
   sorting the frequency intermediate signal into bins;
   using the binary filter to select bins of interest of the bins to create an output frequency signal from the bins of interest.

2. The process of claim 1, wherein the sorting the digital input signal into containers is performed using a Chinese remainder theorem.

3. The process of claim 1, wherein using the binary filter to select bins of interest of the bins to create an output frequency signal from the bins of interest further comprises an error correction algorithm.

4. The process of claim 1, wherein the first FFT and the second FFT are implemented by a graphics processing unit.

5. The process of claim 1, wherein the first FFT and the second FFT are implemented in hardware.

6. The process of claim 5, wherein the second FFT is the first FFT.

7. The process of claim 1, further comprising:
   converting an analog input signal to a digital domain using an analog-to-digital converter to create the digital input signal.

8. The process of claim 1, further comprising:
   retrieving deoxyribonucleic acid (DNA) sequencing data as the digital input signal.

9. The process of claim 1, further comprising:
   receiving the digital input from a neural network.

10. The process of claim 1, further comprising:
    receiving an analog signal from a communications network; and
    converting the analog input signal to a digital domain using an analog-to-digital converter to create the digital input signal.

11. An ultra-wideband receiver comprising:
    an analog-to-digital converter that converts an analog input signal to a digital input signal; and
    a processor coupled to the analog-to-digital converter, wherein the processor performs:
       using a first fast Fourier transform (FFT) with a number of points to convert the digital input signal to a frequency input signal;
       binning the frequency input signal into bins based on frequency and a threshold to create a binary filter;
       sorting the digital input signal into containers;
       collecting, from the containers, a number of points equal to the number of points of the first FFT;
       using a second FFT with the number of points equal to the number of points of the first FFT to convert the digital input signal to a frequency intermediate signal;
       sorting the frequency intermediate signal into bins;
       using the binary filter to select bins of interest of the bins to create an output frequency signal from the bins of interest.

12. The ultra-wideband receiver of claim 11, wherein the sorting the digital input signal into containers is performed using a Chinese remainder theorem.

13. The ultra-wideband receiver of claim 11, wherein using the binary filter to select bins of interest of the bins to create an output frequency signal from the bins of interest further comprises an error correction algorithm.

14. The ultra-wideband receiver of claim 11, wherein the processor is graphics processing unit.

15. An ultra-wideband receiver comprising:
    an analog-to-digital converter that converts an analog input signal to a digital input signal;
    a processor coupled to the analog-to-digital converter;
    a fast Fourier transform (FFT) system implemented in hardware;
    wherein:
    the FFT includes a number of points and converts the digital input signal to a frequency input signal;
    the processor:
       bins the frequency input signal into bins based on frequency and a threshold to create a binary filter;
       sorts the digital input signal into containers;
       collects, from the containers, a number of points equal to the number of points of the first FFT;
    the FFT converts the digital input signal to a frequency intermediate signal; and
    the processor further:
       sorts the frequency intermediate signal into bins;
       uses the binary filter to select bins of interest of the bins to create an output frequency signal from the bins of interest.

16. The ultra-wideband receiver of claim 15, wherein the sorting the digital input signal into containers is performed using a Chinese remainder theorem.

17. The ultra-wideband receiver of claim 15, wherein using the binary filter to select bins of interest of the bins to create an output frequency signal from the bins of interest further comprises an error correction algorithm.

18. The ultra-wideband receiver of claim 15, wherein the processor is graphics processing unit.

19. The ultra-wideband receiver of claim 15, wherein the FFT system includes one FFT.

20. The ultra-wideband receiver of claim 15, wherein the FFT system includes two FFTs.

* * * * *